United States Patent
Li et al.

(10) Patent No.: US 12,057,796 B2
(45) Date of Patent: Aug. 6, 2024

(54) SYSTEMS AND METHODS FOR BACK-EMF MONITORING AND SUPPRESSION DURING INSTALLATION OR PULLING OF PMM-DRIVEN ESP

(71) Applicant: Baker Hughes Oilfield Operations LLC, Houston, TX (US)

(72) Inventors: Yong Li, Owasso, OK (US); Zheng Ye, Claremore, OK (US); Charles Collins, Owasso, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 177 days.

(21) Appl. No.: 17/578,316

(22) Filed: Jan. 18, 2022

(65) Prior Publication Data

US 2023/0231505 A1    Jul. 20, 2023

(51) Int. Cl.
*H02P 29/02* (2016.01)
*F04D 13/08* (2006.01)
*G08B 21/18* (2006.01)
*H02P 29/024* (2016.01)

(52) U.S. Cl.
CPC ............ *H02P 29/027* (2013.01); *F04D 13/08* (2013.01); *G08B 21/182* (2013.01)

(58) Field of Classification Search
CPC ...... H02P 29/027; F04D 13/08; G08B 21/182
See application file for complete search history.

(56) References Cited

U.S. PATENT DOCUMENTS

| | | | | |
|---|---|---|---|---|
| 3,175,125 | A * | 3/1965 | Brown | H01R 9/28 439/850 |
| 9,041,327 | B2 * | 5/2015 | Breitzmann | H02P 29/0241 318/400.22 |
| 10,079,457 | B2 | 9/2018 | Yuratich | |
| 10,454,219 | B2 | 10/2019 | Yuratich | |
| 2005/0030002 | A1 | 2/2005 | Jianwen | |
| 2011/0050145 | A1 | 3/2011 | Sheldon | |
| 2017/0373613 | A1 | 12/2017 | Duerr | |
| 2018/0097466 | A1 * | 4/2018 | Huh | F04D 13/10 |
| 2021/0025381 | A1 * | 1/2021 | Orfanoudakis | E21B 43/128 |

OTHER PUBLICATIONS

International Search Report and Written Opinion issued in PCT/US2023/060654, mailed May 10, 2023, 11 pages.

* cited by examiner

*Primary Examiner* — Rina I Duda
(74) *Attorney, Agent, or Firm* — Sprinkle IP Law Group

(57) ABSTRACT

Systems and methods for monitoring and suppressing a back EMF generated by an ESP motor when the ESP system is moved in a well. Embodiments provide both electrical braking to reduce the rotation of the motor (and corresponding back EMF) and warnings to alert users to hazardous conditions caused by the back EMF. One embodiment includes an ESP system having a permanent magnet motor, a back EMF safety system, and a power cable connected between them. The proximal ends of the cable's conductors are connected terminals of the back EMF safety system, which has switches that are closed to short circuit the conductors so that back EMF currents from rotation of the motor induce electrical braking in the motor. Currents and phase-to-phase voltages on the conductors are monitored to detect overcurrent and overvoltage conditions that may trigger alarms or other actions.

14 Claims, 5 Drawing Sheets

SYSTEMS AND METHODS FOR BACK-EMF MONITORING AND SUPPRESSION DURING INSTALLATION OR PULLING OF PMM-DRIVEN ESP

BACKGROUND

Field of the Invention

The invention relates generally to downhole electric equipment, and more particularly to systems and methods for monitoring and/or suppressing back-EMF generated when a motor of an electric submersible pump system rotates during operations to run (install) the system in a well or pull (remove) the system from a well.

Related Art

Oil is typically produced by drilling wells into oil reservoirs in geological formations and then pumping the oil out of the reservoirs through the wells. Commonly, the oil is produced using ESPs that are deployed in the wells. Electric power suitable for the respective ESPs is normally generated by electric drive systems that are positioned at the surface of each well, and is conveyed from the drive to the ESP via a power cable that extends from the drive system to the deployed ESP.

An ESP typically includes a pump section, a seal section, and a motor section. The power from the electric drive system is provided to the motor, which drives the pump section. Frequently, the motor is a rotary motor which drives a shaft that is coupled to the shaft of a centrifugal pump. The rotating motor shaft causes the pump shaft to rotate, generating fluid pressure that forces fluid out of the well.

Power (usually three-phase AC power) is provided to the windings of the motor's stator, causing the stator to generate rotating magnetic fields. These rotating magnetic fields cause forces to be generated which rotate a rotor, driving the motor shaft to rotate, driving the pump to pump fluid from the well. In the case of an induction motor, the rotating magnetic fields in the stator induce currents and corresponding magnetic fields in the rotor, which causes the rotor to rotate. In the case of a permanent magnet motor, the rotating magnetic fields of the stator interact with a set of permanent magnets in the rotor, causing the rotor to rotate.

As explained above, in normal operation, power supplied to a conventional permanent magnet ESP motor causes the motor to rotate, which causes fluid (e.g., oil) to flow through the pump. What is less frequently considered, however, is that the reverse of this sequence may also be true. In other words, the motor can act as a generator. If fluid is caused to flow through the pump (e.g., when the system is run into the well, when it is pulled from the well, when a pressure test is performed on the well, or when the well operator pumps fluid into the well), this will cause the pump to rotate, which will in turn cause the motor to rotate and generate an AC voltage which is applied to the conductors of the power cable (which may be referred to herein as a back EMF). The generated voltage is often unexpected since the motor normally consumes electrical energy, and it may be dangerous or even fatal to persons working on the system. It would therefore be desirable to provide means to protect these people from the back EMF that may be generated by the ESP motor acting as a generator.

SUMMARY

This disclosure is directed to systems and methods for monitoring and suppressing a back EMF generated by an ESP motor when the ESP system is moved in the well. Embodiments disclosed herein can provide both electrical braking to reduce the rotation of the motor (and corresponding back EMF) and warnings to alert users to hazardous conditions caused by the back EMF.

One embodiment comprises a system for reducing back EMF hazards in an ESP. The system includes an ESP system having a permanent magnet motor, a back EMF safety system, and a power cable connected between them. The power cable has a set of conductors, where the distal ends of the conductors are connected to corresponding terminals of the permanent magnet motor and the proximal ends of the conductors are connected to corresponding terminals of the back EMF safety system. The back EMF safety system is configured to induce electrical braking in the permanent magnet motor when the ESP system is repositioned (moved) in a well. The back EMF safety system monitors currents in the conductors of the power cable and triggers an action such as triggering an audible or visual alarm or disconnecting the conductors from each other in response to detecting an overcurrent condition (e.g., the currents in one or more of the conductors exceeding a predetermined threshold). The back EMF safety system in this embodiment is also configured to monitor phase-to-phase voltages between the conductors of the power cable and to trigger an action (e.g., activating an alarm or burning a fuse) in response to detecting an overvoltage condition (e.g., a monitored voltage exceeding a predetermined threshold).

In some embodiments, the back EMF safety system includes a set of switches that are connected to proximal ends of the conductors of the power cable, where the set of switches are configured to switch between an open mode and a closed mode. In the closed mode, the set of switches short circuit the proximal ends of the conductors of the power cable so that currents flowing through the conductors of the power cable induce electrical braking of the motor. In the open mode, the set of switches disconnect the proximal ends of the conductors from each other to prevent current from flowing through the conductors.

The back EMF safety system may include a relay that contains the set of switches, where the relay is activated to actuate the set of switches to either the open mode or the closed mode. The back EMF safety system may include a controller configured to detect one or more electrical conditions (e.g., overcurrent conditions) and to automatically activate the relay in response to the detected conditions. The back EMF safety system may also include a manual control which enables a user to manually activate the relay to open or close the switches.

The back EMF safety system may include a set of sensors that are configured to monitor electrical currents in the conductors of the power cable. The system may be configured to control the switches to disconnect the proximal ends of the conductors of the power cable from each other in response to detecting the overcurrent condition (e.g., a current in one of the conductors of the power cable exceeding a threshold current). The back EMF safety system may also include a set of sensors configured to monitor phase-to-phase voltages between the conductors of the power cable. The system may trigger an alarm in response to detecting an overvoltage condition (e.g., one of the phase-to-phase voltages between the conductors exceeding a threshold voltage).

In some embodiments, the safety action triggered by the detected overcurrent or overvoltage conditions may comprise transmitting an alarm indication to a user via a wireless channel. The alarms in some embodiments may be selected from multiple different status indications, where the status indication that is selected is dependent upon whether the corresponding overcurrent or overvoltage condition is a hazardous condition or a non-hazardous condition.

An alternative embodiment comprises a method for reducing back EMF hazards when repositioning an electric submersible pump system. The method includes electrically connecting a back EMF safety system to the proximal end of a power cable, where the distal end of the power cable is electrically connected to a permanent magnet motor of an ESP system. Prior to repositioning the ESP system in a well (e.g., running the ESP in the well or pulling the ESP from the well), the back EMF safety system electrically connects the conductors of the power cable at the proximal end of the power cable. The ESP system is then repositioned in the well, where currents may flow through the power cable at the back EMF safety system induce electrical braking of the motor. The back EMF safety system monitors currents in the conductors, and triggers a safety action in response to detecting an overcurrent condition. The back EMF safety system also monitors phase-to-phase voltages between the conductors of the power cable and triggers a safety action in response to detecting an overcurrent condition.

In some embodiments, detecting the overcurrent condition comprises detecting that the current on at least one of the conductors of the power cable exceeds a threshold current, and responsively triggering an alarm. In some embodiments, detecting the overcurrent condition comprises detecting that the current on at least one of the conductors of the power cable exceeds a thermal threshold current. In response to detecting this condition, the back EMF safety system automatically electrically disconnects the set of conductors from each other at the proximal end of the power cable. In some embodiments, after the conductors of the power cable are disconnected from each other, the system monitors phase-to-phase voltages between the conductors and triggers a corresponding safety action in response to detecting a voltage that exceeds a predetermined threshold.

Numerous other embodiments may also be possible.

The various embodiments of the invention may provide a number of advantages over existing systems. For example, the present embodiments do not require mechanical means incorporated into the design of the motor to prevent the motor from rotating when not in use. Because these embodiments do not require mechanical means to lock the motor, they eliminate the challenges of incorporating mechanical designs into the motor and avoid the reduced reliability that may be caused by mechanical locking means. Embodiments of the present invention may also be more easily implemented because they require only additional electronics and power devices at the surface of the well and do not impact the ESP design.

BRIEF DESCRIPTION OF THE DRAWINGS

Other objects and advantages of the invention may become apparent upon reading the following detailed description and upon reference to the accompanying drawings.

Figure 1:
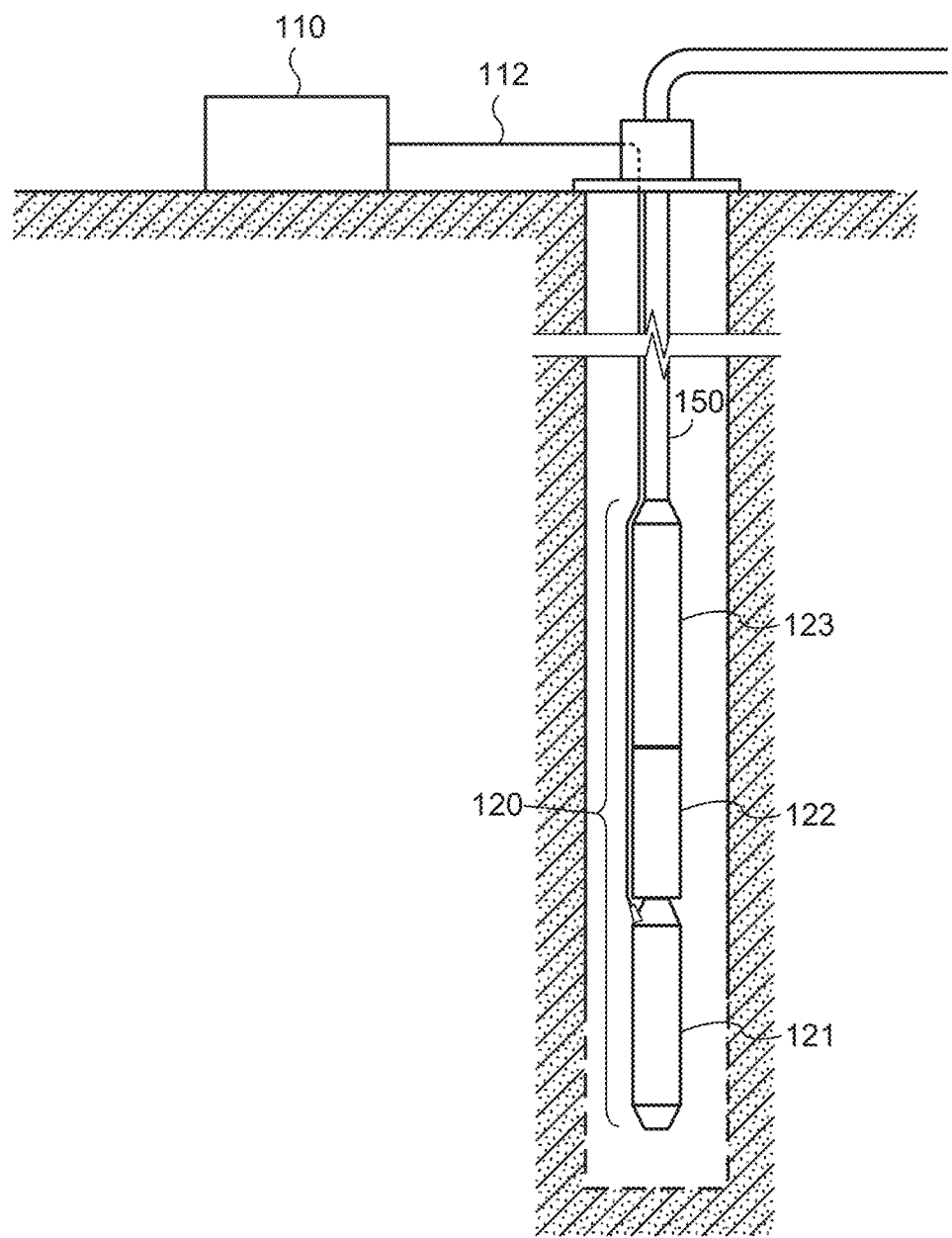
FIG. 1 is a diagram illustrating a conventional ESP system installed in a well.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for monitoring current and voltage on the conductors of the power cable and providing electrical braking to the motor to reduce the back EMF using an electrical apparatus that is connected to the power cable at the surface of the well.

An exemplary embodiment provides current and voltage sensors that monitor the back EMF (voltages) and currents on the three phases (conductors) of the power cable. The voltage and currents on the conductors are monitored and analyzed to obtain rotor speed information. The monitored voltages and currents are compared to predetermined threshold values in order to determine whether the motor is rotating and whether the voltages and/or currents are high enough to present hazards. Appropriate alarms may be activated in response to detecting rotation of the motor or hazardous conditions.

Switches are used to alternately open or close connections between the conductors (where the conductors are short circuited when the switches are closed, and the conductors are disconnected from each other when the switches are open). In the default mode, the switches are closed to allow currents to flow between the conductors, thereby generating electrical braking torque to reduce rotation of the motor. This reduces the back EMF generated by the motor and makes the system safer for operators. Manual controls are provided to allow operators to open or close the switches, enabling the operators to conduct tests of continuity, insulation resistance, and downhole gauge readings (which require the switches to be open).

As noted above, a permanent magnet motor in an ESP can act as a generator when fluid flowing through the pump causes the motor to rotate. This may occur in a number of different circumstances. For example, during certain well operations such as running the equipment in the well, or pulling the equipment from the well, fluid may be forced through the pump. Fluid flowing through the pump may also result from pressure testing in the well, pumping fluid into the well, or well conditions such as natural flow of well fluids, or fluids "bull heading" through the pump, etc. During one of these occurrences, the permanent magnet motor can generate enough electricity to be fatal.

It should be noted that, since induction motors do not use magnets on their rotors, the rotation of these motors is not as likely to present as much of a hazard as permanent magnet motors as in permanent magnet motors. Induction motors can, however, have some residual magnetism that may cause them to generate electricity when rotated by fluid flowing through the pump. Embodiments of the invention may therefore be applicable to induction motors and other types of motors that are used in ESPs, even though they do not normally present the same level of hazard as permanent magnet motors.

Because of the electrical hazard presented by a permanent magnet ESP motor in conditions where fluids flowing through the pump may rotate the rotor (e.g., while installing, pulling, operating or troubleshooting the ESP), embodiments of the present invention are configured to present alarms to users when hazardous (e.g., overcurrent or overvoltage) conditions are detected, and to implement electrical braking of the ESP motors when the ESP systems are moved in the wells to reduce the back EMF developed by the motor.

In an exemplary embodiment, the ESP system includes a multistage centrifugal pump section, a seal section, an ESP motor, and a power cable which transfers electrical power from an electric drive at the surface of the well to the motor, which is downhole in the well. The motor is a three-phase permanent magnet motor. The motor consists of a stator assembly (which may be referred to herein simply as a stator) and a permanent-magnet-type rotor that is affixed to a motor shaft. Support bearings are provided along the shaft and at the ends of the shaft.

When power is applied to the stator, the motor will run, rotating the rotor and shaft in a direction determined by the design of the motor (this direction may be clockwise or counterclockwise, depending on the pump design. Mechanical power is transferred through the seal and to the pump. This is the desired operation condition.

When power is not applied, the permanent magnet motor has the potential to become a generator when turned. Liquid passing through the pump (in either direction) in a conventional ESP system will cause the pump stages to rotate, and the rotation will be transferred to the motor from the pump and seals section shaft. This may potentially occur when the ESP system is run into the well, when the ESP system is pulled from the well, when pressure testing is performed on the well, when fluid is injected into the well, etc. The rotation direction will depend on the direction of flow through the pump.

The motor may potentially generate a high voltage, depending on the stator design and the rotational speed of the rotor. The electricity that is generated by the motor will be transferred back to the surface through the cable. This is an undesirable condition due to the potential to generate electrical energy in the system, such that unprotected personnel or equipment can be harmed or killed by the electricity.

Referring to FIG. 1, a diagram illustrating an ESP system is shown. In this embodiment, an ESP system is installed in a well for the purpose of producing oil, gas or other fluids. The ESP 120 is coupled to the end of production tubing 150 (e.g., coiled tubing) and a power cable 112. The ESP is positioned in a producing portion of the well (as indicated by the dashed lines at the bottom of the wellbore). Surface equipment which includes an electric drive system 110 is positioned at the surface of the well. Drive system 110 is coupled to ESP 120 by power cable 112.

In this embodiment, ESP 120 includes a motor section 121, a seal section 122, and a pump section 123. ESP 120 may include various other components, such as gauge packages, which will not be described in detail here because they are well known in the art and are not important to a discussion of the invention. Motor section 121 is coupled to power cable 112, and is driven by AC power (typically three-phase AC waveforms) that are received from drive system 110 through the cable. Power for the non-motor components of the system (e.g., gauges, telemetry communication systems, etc.) may be provided from motor section 121 to the other components. Seal section 122 is provided between motor section 121 and pump section 123 for purposes including equalizing the pressure between the motor interior and the well bore and allowing the oil within the motor to expand and contract.

When ESP 120 is installed in the well, power provided to motor section 121 via power cable 112 causes the motor section to run, which in turn drives pump section 123. This causes pump section 123 to pump the oil or other fluid through the tubing and out of the well. As noted above, fluids may flow through pump section 123, causing it to rotate, which in turn causes motor section 121 of the ESP to rotate. In this case, motor section 121 acts like a generator, producing a voltage (a back EMF) across its terminals which is applied to power cable 112. If ESP 120 is installed in the well, the fluid may be caused to flow through the pump when the pump is stopped and the column of fluid above the pump falls downward and flows through the pump. Typically in this scenario, the upper (proximal) end of power cable 112 is connected to drive system 110, but there is normally no direct danger to users. If, on the other hand, the flow of fluid through pump section 123 is a result of the ESP being repositioned in the well (e.g., being installed or run into the well, or being removed or pulled from the well), power cable 112 may be disconnected from the drive, so users may be at risk from a back EMF generated by motor section if they are exposed to the conductors of the power cable.

Figure 2:
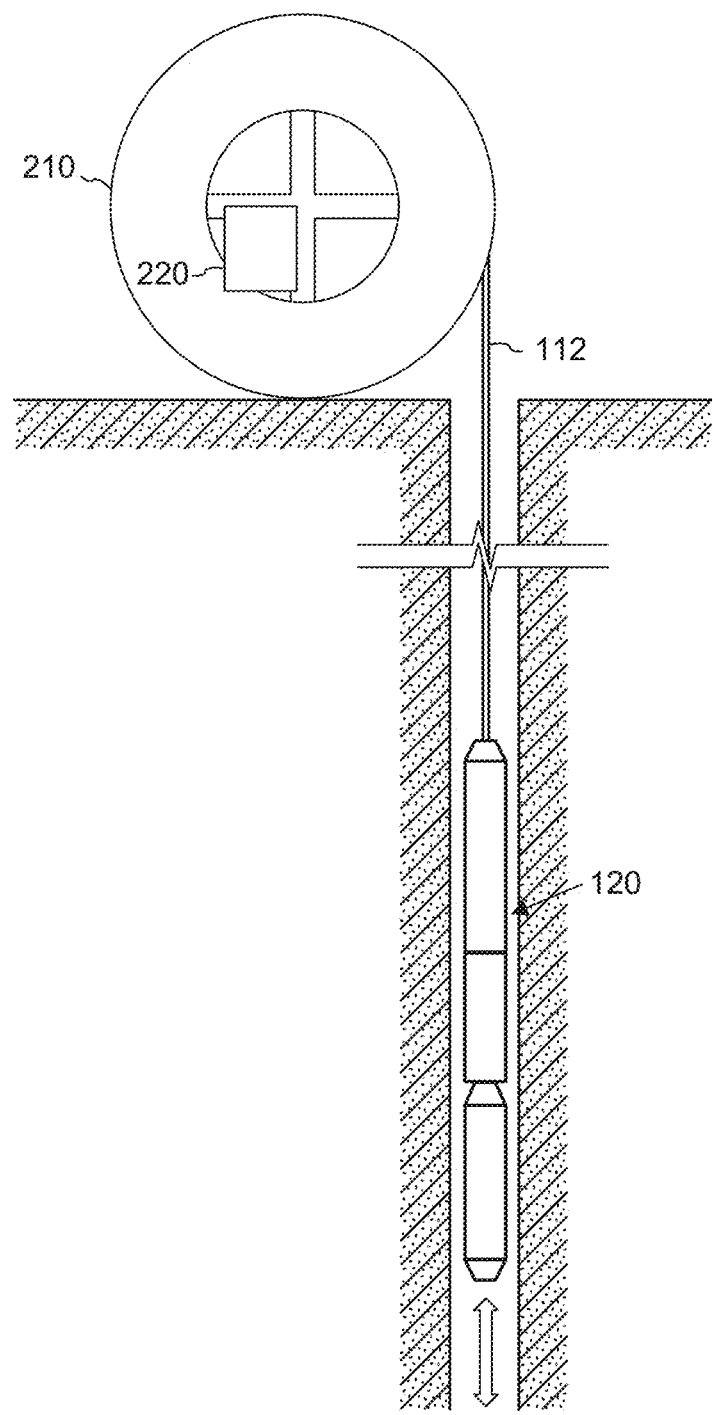
FIG. 2 is a diagram illustrating the repositioning of an ESP system in a well in accordance with some embodiments.

Referring to FIG. 2, a diagram illustrating the repositioning of an ESP system in a well in accordance with some embodiments is shown. As depicted in this figure, an ESP system 120 is connected to a power cable 112. A portion of power cable 112 is deployed in the well, and a portion of the cable is coiled on reel 210. Production tubing (e.g., coiled tubing) may also be connected to ESP 120, but is not explicitly depicted in the figure. A back EMF safety system 220 (sometimes referred to as a "warning box") is attached to reel 220 and is electrically to the upper end of power cable 112.

For purposes of this disclosure, the upper end of power cable 112 which is connected to the back EMF safety system may be referred to as the proximal end of the cable. The end of power cable 112 which is connected to the ESP system may be referred to as the distal end of the cable.

When ESP system 120 is installed in the well, the proximal end of power cable 112 is connected to the leads of back EMF safety system 220 prior to lowering the ESP into the well. It should be noted that in some embodiments the back EMF safety system may be coupled to the cable at points other than the physical terminal end of the cable (e.g., at intermediate points of the cable, such as a splice), so the connection point should be considered the proximal end of the cable for purposes of the disclosure. As ESP system 120 moves downward in the well, it may pass through fluid in the well. The fluid therefore effectively flows upward with respect to ESP system 120, which can cause the ESP's pump section to rotate. The rotation of the pump section in turn causes the ESP's motor to rotate, thereby generating a back EMF.

When ESP system 120 is lowered into the well, back EMF safety system 220 is in its default mode in which it is configured to short circuit the conductors of power cable 112. In this mode, the back EMF generated by the ESP's motor creates currents on the conductors of the power cable which cause electrical braking of the motor. Consequently, the motor does not rotate as rapidly as it would if the conductors of the power cable were not short circuited by the back EMF safety system. The electrical braking provided by back EMF safety system 220 thereby reduces the back EMF and reduces the hazard to users who may be exposed to the power cable.

The scenario in which ESP system 120 is pulled from the well is similar. Presumably, the ESP system was previously being operated in the well, so the proximal end of power cable 112 is disconnected from the electric drive system and is connected to the leads of back EMF safety system 220. As ESP system 120 is moved upward in the well, fluids in the well effectively flow downward with respect to the ESP system causing rotation of the ESP's pump motor, which then generate a back EMF.

As noted above, in the default operating mode of back EMF safety system 220, the conductors of power cable 112 are short circuited, so the back EMF generated by the motor creates currents which in turn cause electrical braking in the motor. This reduces the back EMF and reduces the hazard to users who may come in contact with the power cable.

In addition to providing electrical braking, embodiments of back EMF safety system 220 may provide electrical monitoring and alarm features. For example, embodiments may monitor and provide measurements of currents on each of the three conductors of the power cable (the three phases of the cable). Back EMF safety system 220 may then compare the measured currents to one or more current threshold values, and may trigger certain actions in response to the threshold values being exceeded by the measured values. For example, if a measured current exceeds a first, lower threshold value, the back EMF safety system may trigger an alarm which indicates that the ESP motor is rotating. Further, if a measured current exceeds a second, higher threshold value (a "thermal threshold"), the system may trigger an alarm and also disconnect the conductors from each other in order to interrupt the current and prevent overheating in both the motor and the back EMF safety system.

Further, embodiments may monitor and provide measurements of phase-to-phase voltages between the conductors of the power cable. When the conductors of the power cable are short circuited, the phase-to-phase voltages are 0, but the voltages are non-zero when the conductors are disconnected from each other. The measured voltages are compared to a threshold voltage, and an alarm is triggered if the measured voltages exceed the threshold value.

Back EMF safety system 220 may also provide a manual control for short circuiting or disconnecting the conductors of the power cable. In some embodiments, the back EMF safety system May be configured to apply a test voltage to the conductors of the power cable in order to perform phase-to-phase resistance measurements between the conductors.

Figure 3:
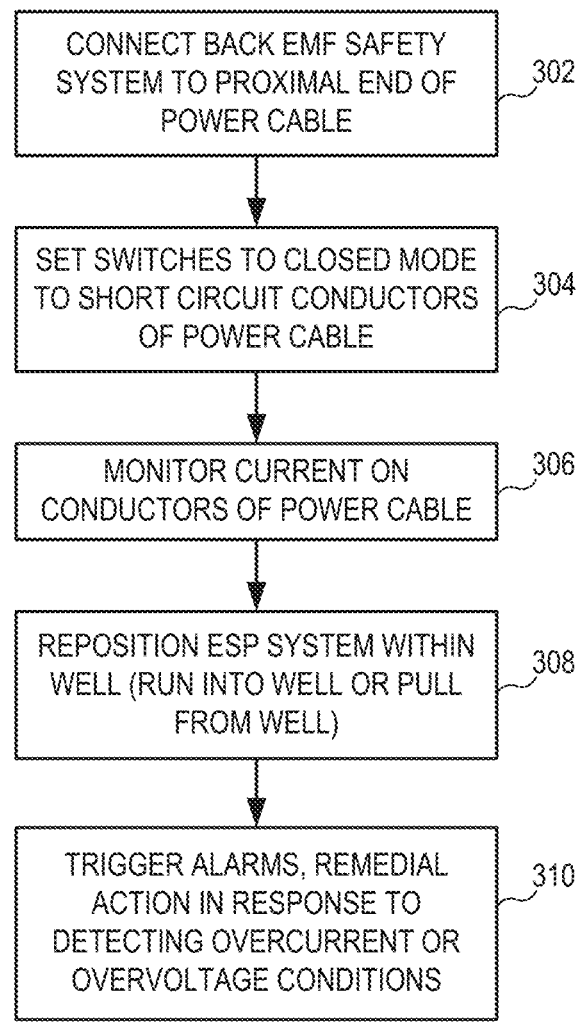
FIG. 3 is a diagram illustrating a method for providing back EMF protection when repositioning an ESP system in a well in accordance some embodiments.

Referring to FIG. 3, a flow diagram is shown to illustrate a method for providing back
EMF protection when repositioning an ESP system in a well in accordance with some embodiments. When it is desired to reposition the ESP system, the proximal end of the power cable is connected to the leads of the back EMF safety system (step 302). If the ESP system was previously installed and operated in the well, it may first be necessary to disconnect the proximal end of the power cable from the electric drive of the ESP system. If the ESP system has not yet been installed, the proximal end of the power cable is likely already disconnected.

With the back EMF safety system connected to the proximal end of the power cable, the switches of the back EMF safety system are set to the closed position to short circuit the conductors of the power cable (step 304). The closed position is the default setting in some environments, so the switches may already be in the proper position. With the switches in the closed position, back EMF safety system monitors the current on the conductors of the power cable (step 306). While the conductor currents are being monitored, the ESP system is repositioned in the well (step 308) (e.g., run into the well, or pulled out of the well). It is not necessary to completely install or uninstall the ESP system—the ESP system may in some cases simply be repositioned to a different location within the well. Also, as noted above, the system may be used when operations such as pressure testing the well or injecting fluid into the well are performed.

The back EMF safety system monitors the current on the conductors of the power cable as these operations are performed. The current measured by the back EMF safety system may be compared to one or more threshold values to determine whether action needs to be taken in response to the level of the current. in summary, the measured currents are compared to a first threshold which is relatively low in order to provide an indication of whether the motor is rotating, and are also compared to a higher threshold value in order to provide an indication of whether the motor and/or safety system are in danger of overheating. If the measured current is determined to exceed one of these threshold values, the back EMF safety system will trigger some action, such as activating an alarm, or setting the switches to an open position in which the proximal end of the power cable conductors are disconnected from each other (step 310). After the conductors are disconnected from each other, the back EMF safety system may continue to monitor voltages (and/or currents) on the conductors and provide warnings or remedial actions (e.g., burning a fuse to prevent an over-voltage condition).

Figure 4:
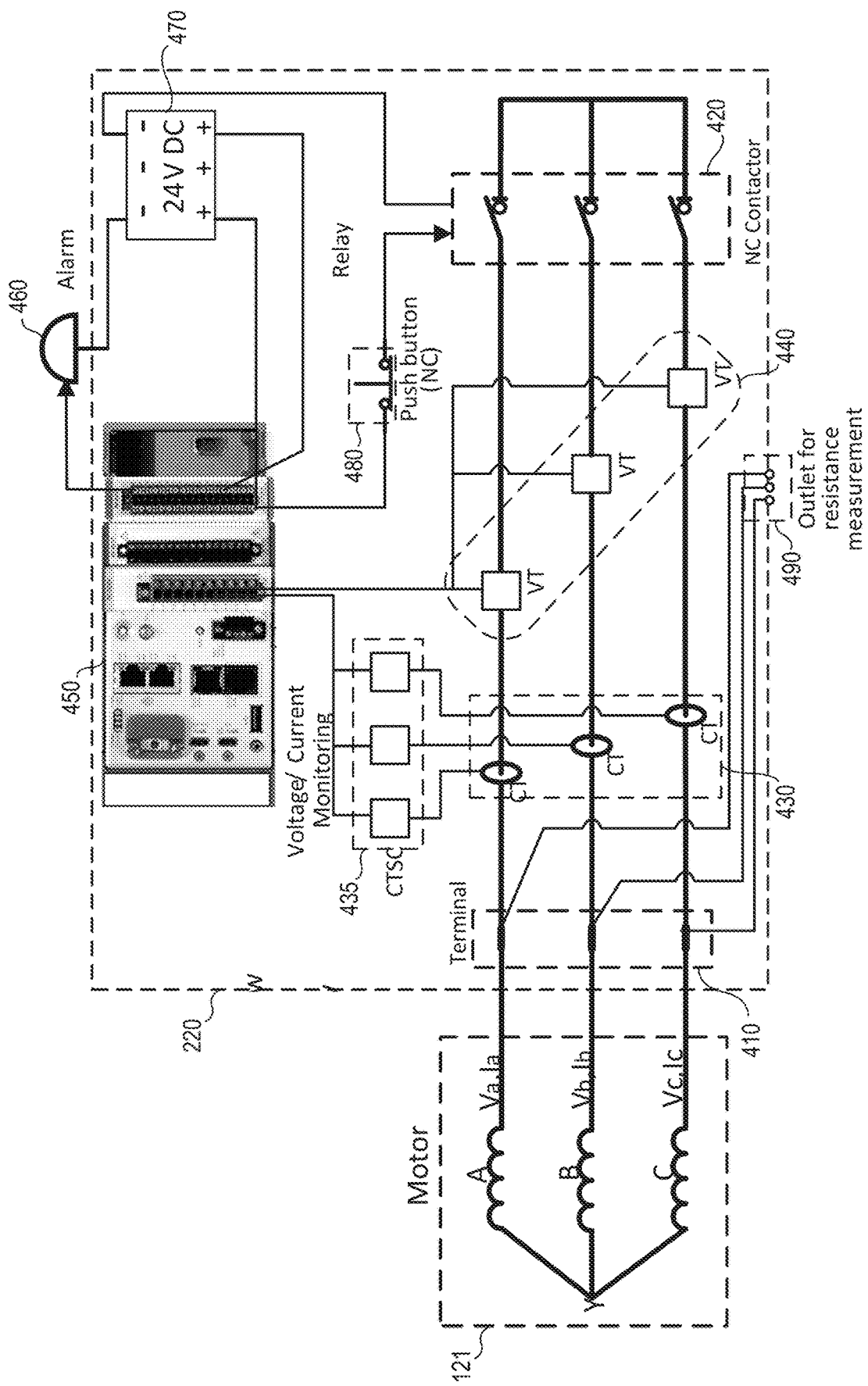
FIG. 4 is a circuit diagram illustrating the components of an exemplary back EMF safety system in accordance some embodiments.

Referring to FIG. 4, a circuit diagram illustrating the components of an exemplary back EMF safety system in accordance with some embodiments is shown. This embodiment is designed to provide functions including: measuring and monitoring the currents of all three phases (i.e., on all three conductors); measuring and monitoring phase-to-phase voltages between all three conductors; keep all three cable leads short circuited to each other as a default; activate an alarm when the monitored currents exceed a threshold that indicates the motor is rotating; activate an alarm if the monitored phase-to-phase voltages exceed voltage threshold when the switches are open (i.e., the conductors of the power cable are not short circuited to each other; and automatically control the switches to open when the monitored currents exceed a thermal threshold to overheating of the motor and the back EMF safety system.

In the example of FIG. 4, back EMF safety system 220 has a set of terminals 410 (and/or leads) which enable the back EMF safety system to be coupled to the conductors of power cable 112. Internal to back EMF safety system 220, each of the terminals is connected to a corresponding one of a set of contactors/switches 420. Contactors/switches 420 are controlled by a relay which simultaneously actuates each of them to either an open position or a closed position.

In FIG. 4, the contactors/switches are shown in the closed position. In this position, the conductors of the power cable are short circuited to each other. This may be referred to as a closed mode, or a short circuited mode. In this mode, current generated by motor 121 on each of the conductors/phases is allowed to flow to the other conductors/phases, generating electrical braking in the motor and reducing the back EMF on the conductors.

Back EMF safety system 220 has a set of current transducers 430, each of which is couple to a corresponding one of the conductors of the power cable. Current transducers 430 generate signals indicating the current flowing through the corresponding conductor. The signal from each current transducer is provided to a corresponding signal conditioner 435 which processes the signal and provides it to control circuitry 450. Control circuitry 450 processes the received current signals to, for example, determine whether the current carried by any of the conductors exceeds threshold values that are maintained by the circuitry.

For instance, control circuitry 450 may compare the measured currents to a first threshold value (e.g., 1 amp) and, if the current exceeds this threshold, the control circuitry may trigger an alarm 460 which indicates that the motor is moving. A battery 470 provides power to the control circuitry and the alarm. Control circuitry 450 may also be configured to compare the measured current signals to a higher, thermal threshold. This higher threshold value is referred to as a "thermal threshold" because it is used as an indicator that the current has reached a level that may result in overheating of the motor and or the back EMF safety system. If it is determined by the control circuitry that the measured current exceeds the thermal threshold, the control circuitry may trigger the relay to open contactors/switches 420 In order to stop the flow of current and prevent the overheating of the devices.

Back EMF safety system 220 also includes a manual switch 480 which can be activated by a user two actuate the relay and open the contactors/switches 420. The user may wish to set contactors/switches two the open position to perform a resistance measurement across the conductors. Control circuitry 450 may be configured to apply a low voltage (e.g., 12V or 24V provided by battery 470) to the conductors of the power cable and then measure the currents on the conductors using current transducers 430. The known voltage and current measurements generated by current transducers 430 and voltage transducers 440 are used by control circuitry 450, which performs resistance calculations based on these measurements.

Figure 5:
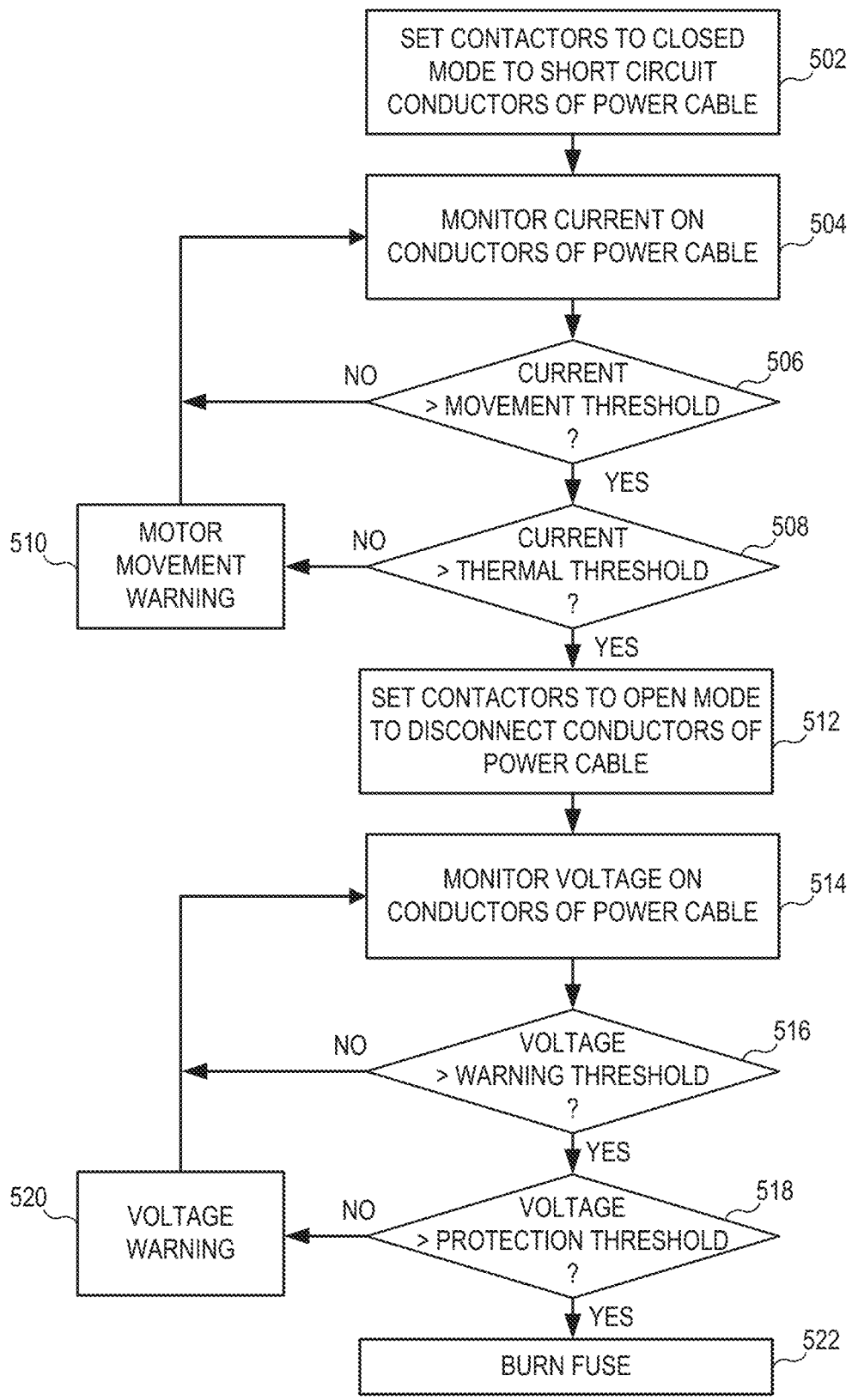
FIG. 5 is a flow diagram illustrating an example of the flow of the control logic for a back EMF safety system in accordance some embodiments.

Referring to FIG. 5, a flow diagram illustrating an example of the flow of the control logic for the back EMF safety system of FIG. 4 is shown. In this example, the contactors/switches of are set to the closed position so that the conductors of the power cable are short circuited to each other (step 502). As noted above, the switches in some embodiments of the back EMF safety system default to the closed condition. With the switches in the closed position, current can flow through the conductors, so the system monitors these currents (step 504). The monitored currents are compared to a first predetermined threshold (step 506). This threshold is used to detect movement of the motor and is relatively low. If the system does not detect a current that exceeds this threshold, the system simply continues to monitor the currents on the conductors (step 504).

If at step 506 the system detects a current that is greater than the first threshold, the system compares the current to a second, thermal threshold (step 508). The thermal threshold corresponds to a current level which is high enough that either the ESP motor or the back EMF safety system are at risk of overheating. If the current exceeds the first threshold but does not exceed the thermal threshold, the system provides a motor movement warning (step 510) which indicates to users that the motor is rotating.

If the current on the conductors exceeds the thermal threshold, then the system sets the contactors/switches to the open position (step 512), thereby disconnecting the conductors of the power cable from each other. This prevents current from flowing between the conductors and prevents resulting overheating, but also eliminates the electrical braking that is provided when the conductors are short circuited to each other.

With the contactors in the open mode, the system monitors the phase-to-phase voltages between the conductors of the power cable (step 514). The monitored voltages are compared to a first, warning voltage threshold (step 516), and if the voltages do not exceed this warning threshold, the system simply continues to monitor the phase-to-phase voltages (step 514). If at step 516 the voltages exceed the warning threshold, they are compared to a second, protection threshold (step 518). If the voltages do not exceed the protection threshold, a voltage warning is generated (step 520). The warning may be audible, visual, or of any other suitable type. If the voltages exceed the protection threshold, then the voltages are high enough that the system is at risk of being damaged, so a fuse in the system is burned (step 522) in order to protect the system from the potential damage. In some embodiments, a circuit breaker or similar switch may be provided to disconnect the system and prevent damage to the system. This would also provide a testing location at which it could be determined whether the high voltage had dissipated before the system is re-engaged.

The foregoing embodiments are intended to be illustrative of the invention rather than limiting, and alternative embodiments may uses means other than those described above to implement the functionality of the back EMF safety system. Alternative embodiments may also have variations from the above examples that may not affect the functionality of the system. For example, some embodiments of the back EMF safety system may be connected to the power cable at an intermediate point on the cable rather than the terminal proximal end of the cable. Additionally, alternative embodiments of the back EMF safety system may use different physical components and may implement different control logic to achieve reduction of back EMF hazards.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed by the claims of the application.

What is claimed is:

1. A system for reducing back EMF hazards in an electric submersible pump (ESP) comprising:
an ESP system having a permanent magnet motor;
a power cable having a set of conductors having corresponding distal ends connected to corresponding terminals of the permanent magnet motor, wherein the power cable is disconnected from an electric drive system; and
a back EMF safety system connected to the power cable, wherein the back EMF safety system includes a set of switches connected to proximal ends of the conductors of the power cable, the set of switches configured to switch between an open mode and a closed mode, wherein in the open mode, the set of switches disconnect the proximal ends of the conductors of the power cable from each other, wherein in the closed mode, the set of switches short circuit the proximal ends of the conductors of the power cable, wherein in the closed mode, currents flowing through the conductors of the power cable induce electrical braking in the motor,
the back EMF safety system configured to induce electrical braking of the permanent magnet motor when the ESP system is repositioned in a well,
the back EMF safety system configured to monitor currents in the set of conductors and to trigger a first safety action in response to detecting an overcurrent condition, and
the back EMF safety system configured to monitor phase-to-phase voltages between the set of conductors and to trigger a second safety action in response to detecting an overvoltage condition.

2. The system of claim 1, wherein the back EMF safety system includes a relay containing the set of switches, wherein the relay is activated to actuate the set of switches to either the open mode or the closed mode.

3. The system of claim 2, wherein the back EMF safety system includes a controller configured to detect one or more electrical conditions and to automatically activate the relay in response to the detected one or more electrical conditions, the back EMF safety system further including a manual control which enables a user to manually activate the relay.

4. The system of claim 1, wherein the back EMF safety system includes a set of sensors configured to monitor electrical currents in the conductors of the power cable, and wherein the back EMF safety system is configured to control the switches to disconnect the proximal ends of the conductors of the power cable from each other in response to detecting the overcurrent condition comprising a current in one of the conductors of the power cable exceeding a threshold current.

5. The system of claim 1, wherein the back EMF safety system includes a set of sensors configured to monitor phase-to-phase voltages between the conductors of the power cable, and wherein the back EMF safety system is configured to trigger an alarm in response to detecting the overvoltage condition comprising at least one of the phase-to-phase voltages between the conductors of the power cable exceeding a threshold voltage.

6. The system of claim 1, wherein the first safety action comprises triggering an alarm in response to detecting that the current in the one of the conductors of the power cable exceeds the threshold current.

7. The system of claim 6, wherein the alarm includes an audible indication of the overcurrent condition and a visual indication of the overcurrent condition.

8. The system of claim 6, wherein the first safety action comprises transmitting an alarm indication to a user via a wireless channel.

9. The system of claim 1, wherein each of the first and second safety actions triggered by the back EMF safety system is selected from a plurality of different status indications, wherein the selected one of the plurality of different status indications is dependent upon whether the corresponding overcurrent or overvoltage condition is a hazardous condition or a non-hazardous condition.

10. The system of claim 1, wherein the back EMF safety system is configured to enable, when the set of switches are in the open mode, measurement of phase-to-phase resistance of the conductors of the power cable.

11. A method for reducing back EMF hazards when repositioning an electric submersible pump system, the method comprising:
disconnecting an electric drive system from a proximal end of a power cable, a distal end of the power cable being electrically connected to a permanent magnet motor of an electric submersible pump (ESP) system;
electrically connecting a back EMF safety system to the proximal end of the power cable, wherein the back EMF safety system includes a set of switches connected to proximal ends of the conductors of the power cable, the set of switches configured to switch between an open mode and a closed mode, wherein in the open mode, the set of switches disconnect the proximal ends of the conductors of the power cable from each other, wherein in the closed mode, the set of switches short circuit the proximal ends of the conductors of the power cable, wherein in the closed mode, currents flowing through the conductors of the power cable induce electrical braking in the motor;
prior to repositioning the ESP system in a well, the back EMF safety system electrically connecting a set of conductors of the power cable at the proximal end of the power cable;
repositioning the ESP system in the well, wherein currents flowing through the conductors of the power cable at the back EMF safety system induce electrical braking of the motor;
monitoring, by the back EMF safety system, currents in the set of conductors, and triggering a first safety action in response to detecting an overcurrent condition; and
monitoring, by the back EMF safety system, phase-to-phase voltages between the set of conductors, and triggering a first safety action in response to detecting an overcurrent condition.

12. The method of claim 11, wherein detecting the overcurrent condition comprises detecting that the current on at least one of the conductors of the power cable exceeds a thermal threshold current, and wherein triggering the first safety action comprises the back EMF safety system automatically electrically disconnecting the set of conductors of the power cable from each other at the proximal end of the power cable.

13. The method of claim 12, further comprising, after the set of conductors of the power cable are disconnected from each other, monitoring phase-to-phase voltages between the conductors of the power cable and triggering a second safety action in response to detecting a voltage that exceeds a predetermined threshold.

14. The method of claim 11, wherein detecting the overcurrent condition comprises detecting that the current on at least one of the conductors of the power cable exceeds a threshold current, and wherein triggering the first safety action comprises triggering an alarm.

* * * * *